(12) United States Patent
Li (10) Patent No.: US 10,116,638 B2
(45) Date of Patent: Oct. 30, 2018

(54) METHOD AND DEVICE FOR UPLOADING DATA TO SOCIAL PLATFORM

(71) Applicant: TENCENT TECHNOLOGY (SHENZHEN) COMPANY LIMITED, Shenzhen (CN)

(72) Inventor: Yonghua Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 18 days.

(21) Appl. No.: 14/734,001

(22) Filed: Jun. 9, 2015

(65) Prior Publication Data

US 2015/0271165 A1 Sep. 24, 2015

Related U.S. Application Data

(63) Continuation of application No. PCT/CN2013/089758, filed on Dec. 18, 2013.

(30) Foreign Application Priority Data

Dec. 19, 2012 (CN) .......................... 2012 1 0553223

(51) Int. Cl.
*H04L 29/06* (2006.01)
*G06F 21/00* (2013.01)
(Continued)

(52) U.S. Cl.
CPC .............. *H04L 63/08* (2013.01); *H04L 29/08* (2013.01); *H04L 65/403* (2013.01); *H04L 67/02* (2013.01);
(Continued)

(58) Field of Classification Search
CPC ... H04L 63/08; H04L 65/403; H04L 67/1095; H04L 67/02; H04L 67/04; H04L 67/06; H04L 29/08; H04W 4/206; H04W 4/003
See application file for complete search history.

(56) References Cited

U.S. PATENT DOCUMENTS

| 8,136,148 B1 * | 3/2012 | Chayanam | G06F 21/31 713/183 |
| 8,533,336 B1 * | 9/2013 | Scheffler | G06F 9/4445 709/226 |

(Continued)

FOREIGN PATENT DOCUMENTS

| CN | 101321067 A | 12/2008 |
| CN | 101930456 A | 12/2010 |

(Continued)

OTHER PUBLICATIONS

International Preliminary Report for Application No. PCT/CN2013/089758 dated Jul. 2, 2015.
(Continued)

*Primary Examiner* — Lisa C Lewis
(74) *Attorney, Agent, or Firm* — Anova Law Group, PLLC (57) ABSTRACT

A method and device for uploading data to a social platform. The method includes a plugin set into an application program. The plugin integrates at least one Application Program Interface (API) possessing publishing function provided by at least one social platform. A request for uploading data to a social platform is received and data to be uploaded is obtained according to the request. The data is uploaded to the corresponding social platform through an API possessing publishing function integrated by the plugin. Date may be uploaded through the plugin to one or more social platforms (Continued)

simultaneously without launching a client terminal of the corresponding social platforms.

19 Claims, 5 Drawing Sheets

(51) Int. Cl.
    *H04W 4/21*     (2018.01)
    *H04W 4/60*     (2018.01)
    *H04L 29/08*     (2006.01)
    *H04W 4/00*     (2018.01)
    *H04W 4/20*     (2018.01)

(52) U.S. Cl.
    CPC .............. *H04L 67/04* (2013.01); *H04L 67/06* (2013.01); *H04L 67/1095* (2013.01); *H04W 4/003* (2013.01); *H04W 4/206* (2013.01); *H04W 4/21* (2018.02); *H04W 4/60* (2018.02)

(56) References Cited

U.S. PATENT DOCUMENTS

| | | | | |
|---|---|---|---|---|
| 8,700,236 B1* | 4/2014 | Berman | ................. | G07C 5/008 701/15 |
| 2009/0222720 A1* | 9/2009 | Drieschner | ....... | G06F 17/30887 715/234 |
| 2009/0328120 A1* | 12/2009 | Finger | .................... | H04N 5/76 725/110 |
| 2010/0070842 A1* | 3/2010 | Aymeloglu | ......... | G06F 17/2288 715/207 |
| 2011/0196853 A1* | 8/2011 | Bigham | .............. | G06F 9/45512 707/706 |
| 2012/0290109 A1* | 11/2012 | Engelberg | ........... | G06F 19/3481 700/91 |
| 2013/0013700 A1* | 1/2013 | Sittig | ..................... | G06Q 10/10 709/206 |
| 2013/0040729 A1* | 2/2013 | Griffin | ................... | G06Q 30/00 463/25 |
| 2013/0103575 A1* | 4/2013 | Bhatia | ................... | G06F 3/1222 705/39 |
| 2013/0238724 A1* | 9/2013 | Cunningham | ........... | H04L 51/24 709/206 |
| 2013/0263049 A1* | 10/2013 | Lehtiniemi | ......... | G11B 27/034 715/810 |

FOREIGN PATENT DOCUMENTS

| | | |
|---|---|---|
| CN | 102137058 A | 7/2011 |
| CN | 102164146 * | 8/2011 |
| CN | 102164146 A | 8/2011 |
| CN | 102202090 A | 9/2011 |
| CN | 102508843 A | 6/2012 |
| CN | 102611709 A | 7/2012 |

OTHER PUBLICATIONS

Chinese Office Action for Application No. 2012105532231 dated Dec. 19, 2012, and an English concise explanation of relevance thereof.

International Search Report for International Application No. PCT/CN2013/089758, dated Mar. 6, 2014.

* cited by examiner

METHOD AND DEVICE FOR UPLOADING DATA TO SOCIAL PLATFORM

CROSS-REFERENCE TO RELATED APPLICATIONS

This application is a continuation of International Application No. PCT/CN2013/089758, filed Dec. 18, 2013. This application claims the benefit and priority of Chinese Application No. 201210553223.1, filed Dec. 19, 2012. The entire disclosures of each of the above applications are incorporated herein by reference.

FIELD

The present disclosure relates to Internet technologies and to a method and device for uploading data to a social platform.

BACKGROUND

This section provides background information related to the present disclosure which is not necessarily prior art.

With the promotion and popularization of the Internet browser, the resources and contents capable of being accessed have increased. For instance, novels, news, pictures, logs, and micro-blogs may be browsed. A user may want to take a screenshot of the contents or pages that are of particular interest and share the screenshot image in a space or a micro-blog.

When a user wants to share the screenshot image in a micro-blog or other social platforms, it is first necessary for the user to open a corresponding social platform and log on through a browser, or pre-install a corresponding application program on the local terminal and launch the corresponding social application program, which then allows the user to upload the screenshot image on the social platform with the uploading function provided by the social platform. However, it is necessary for the user to switch to the current page for uploading the screenshot image. The operation is complicated and limiting and does not allow for the user to share multiple social platforms simultaneously and quickly.

SUMMARY

This section provides a general summary of the disclosure, and is not a comprehensive disclosure of its full scope or all of its features.

According to various embodiments of the present disclosure, a method and device for uploading data to a social platform is provided to simplify the operation for uploading data to a social platform and increase uploading speed.

The method for uploading data to a social platform provided by various embodiments of the present disclosure includes setting a plugin into an application program wherein the plugin integrates at least one Application Program Interface (API), possessing a publishing function provided by at least one social platform, receiving a request for uploading data to a social platform, obtaining data to be uploaded according to the request, and uploading the data to the social platform through an API possessing publishing function integrated by the plugin.

The device for uploading data to a social platform provided by various embodiments of the present disclosure includes an interacting module configured to receive a request for uploading data to a social platform, a data obtaining module configured to obtain data to be uploaded according to the request, and a plugin module integrating at least one Application Program Interface (API) possessing publishing function provided by at least one social platform and configured to upload the data obtained by the data obtaining module to a corresponding social platform through corresponding API.

The device for uploading data to a social platform provided by other various embodiments of the present disclosure includes a memory and a processor in communication with the memory and a group of instructions stored by the memory which may be executed by the processor. The instructions are comprised of an interacting instruction to indicate receiving a request for uploading data to a social platform, a data obtaining instruction to indicate obtaining data to be uploaded according to the request, and a plugin instruction integrating at least one Application Program Interface (API) possessing publishing function provided by at least one social platform to indicate uploading the data obtained by the data obtaining module to a corresponding social platform through corresponding API.

Compared with the conventional method, through the methods of the various embodiments of the present disclosure, a user may upload data to one or multiple social platforms simultaneously through a plugin without launching client terminals of corresponding social platforms. Thus the operation for uploading data to a social platform is simplified and the uploading speed is increased. Particularly for a mobile terminal, device resource may be saved since it is not necessary to install a client terminal of the social platform. Various embodiments of the present disclosure address the challenges in the prior art which requires a user to switch the current page when data needs to be uploaded to a social platform.

Further areas of applicability will become apparent from the description provided herein. The description and specific examples in this summary are intended for purposes of illustration and are not intended to limit the scope of the present disclosure.

DRAWINGS

The drawings described herein are for illustrative purposes of selected embodiments and not all possible implementations, and are not intended to limit the scope of the present disclosure.

Features of the present disclosure are illustrated by way of example and not limited in the following figures.

Corresponding reference numerals indicate corresponding parts throughout the several views of the drawings.

DETAILED DESCRIPTION

Example embodiments will now be described more fully with reference to the accompanying drawings.

Reference will now be made in detail to examples, which are illustrated in the accompanying drawings. In the following detailed description, numerous details are set forth in order to provide a thorough understanding of the present disclosure. Also, the figures are illustrations of various embodiments, in which modules or procedures shown in the figures are not necessarily required for implementing the present disclosure. In other instances, well-known methods, procedures, components, and circuits have not been described in detail so as not to unnecessarily obscure aspects of the various embodiments. As used herein, the term "includes" means includes but not limited to, the term "including" means including but not limited to. The term "based on" means based at least in part on. In addition, the terms "a" and "an" are intended to denote at least one of a particular element.

Figure 1:
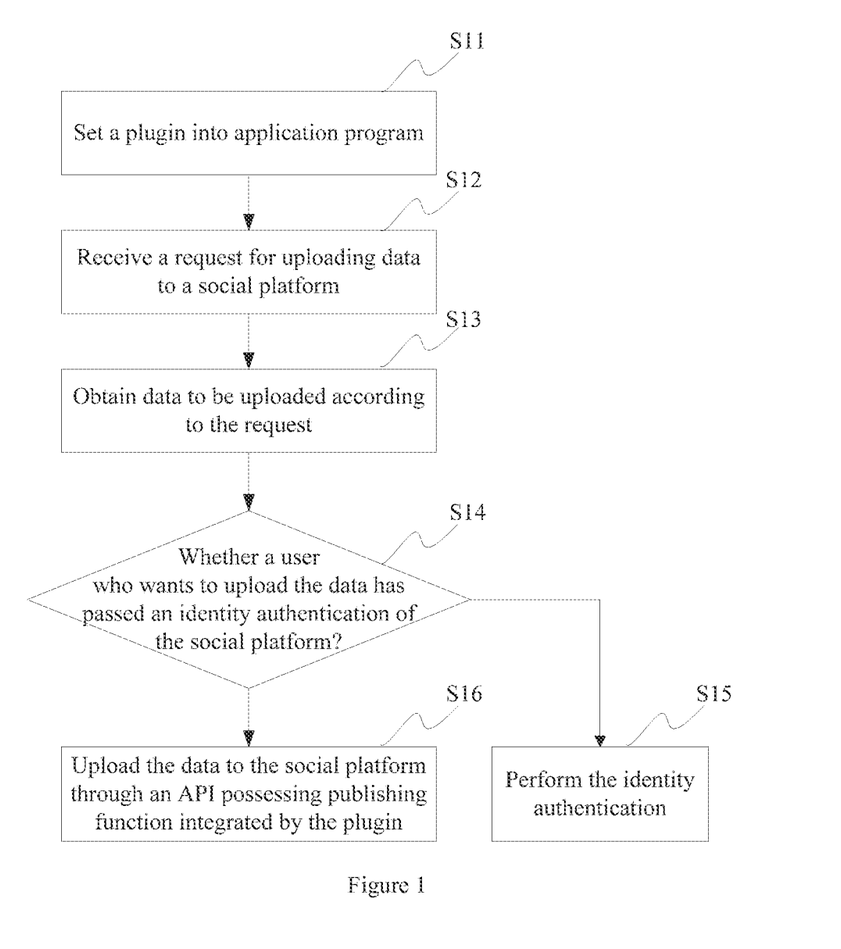
FIG. 1 is a flow diagram illustrating a method for uploading data to a social platform according to various embodiments.

FIG. 1 is a flow diagram illustrating a method for uploading data to a social platform according to various embodiments. As shown in FIG. 1, the method includes the following processes.

Block S11: A plugin is set into application program. The plugin integrates at least one Application Program Interface (API) possessing publishing function provided by at least one social platform. The application program according to various embodiments may be various computer programs possessing a displaying function, such as a browser. The plugin may be a sidebar plugin. The social platform according to the various embodiments refers to a platform with which the users may share their knowledge, feelings, and other information, such as, Tencent micro-blog, Sina micro-blog, QQ space, Renren net, Happy net, etc. Each social platform provides an open platform interface to developers to develop applications.

Before the plugin is set, it is possible to register developer information on a corresponding social platform in advance. Considering Sina micro-blog as an example, it is possible to register information of a developer on the Sina open platform (open.weibo.com) first and an application is then created. After the application is created successfully, the Sina open platform may generate an APP key (also known as an API verification number, and used to verify the validity of an API access. In general, in order to access an API interface of a website, it is necessary to obtain permission from the website.) for the developer. Using the APP key, a Software Development Kit (SDK) may be obtained. The SDK includes an API possessing publishing function provided by the social platform, i.e. Sina micro-blog.

After application program interfaces (each application program interface is usually included in a SDK provided by a social platform) possessing publishing function of various social platforms are obtained by using methods similar to the above-mentioned method, a plugin may be set for the application program. The plugin is required to integrate APIs of various social platforms.

Considering when a plugin is set in an Android browser as an example, the plugin setting procedure may include attributes such as: <meta-data android:name="plugin_class" android:value="className"/><uses-permission android:name="com.tencent.mtt.extension.addon" /> are added in AndroidManifest.xml. The plugin inherits an abstract class AbstractAddOn in the SDK specification of browser plugins.

Since the SDK provided by a social platform usually includes an API possessing publishing function, data may be uploaded through the plugin to a corresponding social platform for publishing information. In addition, the plugin may integrate one or more APIs possessing a publishing function of one or more social platforms. Therefore, data may be uploaded to multiple social platforms based on the plugin.

Block S12: A request for uploading data to a social platform is received. That is, when a user wants to upload content that the user is interested in to a social platform for sharing, the user may send a request for uploading data to an application program or a plugin.

Block S13: Data to be uploaded is obtained according to the request. The data to be uploaded may be an image or text and may be obtained utilizing functions of the application program. When the application program is a browser, the screenshot function of the browser may be used and a screenshot image of a selected area, current visible page or the whole page may be taken as data to be uploaded and the data may be shared in each social platform. Block S14: It is determined whether the user has passed an identity authentication of a corresponding social platform. When the user has passed the identity authentication of the corresponding social platform, proceed with block S16; otherwise, proceed with block S15. The identity authentication performed by the user on the social platform is not necessarily a required process. However, considering the accuracy of information publishing, the majority of social platforms will perform an identity authentication. After the identity authentication is passed, it may be ensured that data uploaded on the social platform may be released to a correct account of the user.

Block S15: Authentication information is sent to the corresponding social platform through an authentication communication protocol interface, which is integrated by the plugin and provided by the corresponding social platform so that the corresponding social platform may perform the identity authentication according to the authentication information.

The SDK provided by a social platform usually further includes an authentication communication protocol interface. The authentication communication protocol interface may communicate with the social platform for identity authentication through the OAuth protocol. The OAuth protocol may provide a secure, open, and simple standard for authorization of user resources. When the identity authentication is performed with the OAuth protocol, user account information, such as user name and password, cannot be touched by a third party. Namely, the third party may apply for an authorization of user resources without the user name and password of the user. Thus the security is very high. Block S16: The data is uploaded to the corresponding social platform through an API possessing publishing function integrated by the plugin. The method for uploading data to a social platform provided by various embodiments may be applied to a browser or other appropriate application programs.

According to various embodiments, after a user passes the authentication, the user may directly upload data through the plugin to a corresponding social platform to publish and share the data without launching a client terminal of the corresponding social platform. Compared with the conventional method, through technical methods of the various embodiments, a user may upload data to multiple social platforms simultaneously without launching client terminals of corresponding social platforms. Thus, the operations for uploading data to a social platform may be simplified and uploading speed may be increased. For a mobile terminal, device resources may be saved since it is not necessary to install a client terminal of the social platform.

Figure 2:
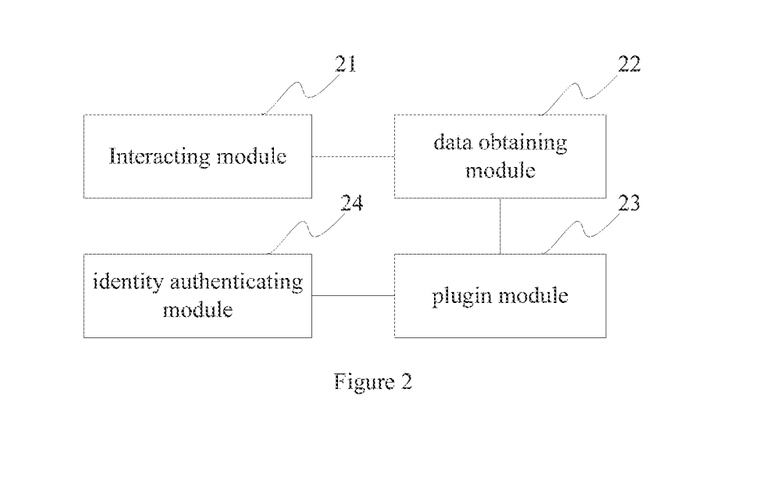
FIG. 2 is a diagram illustrating a structure of a device for uploading data to a social platform according to various embodiments.

Various embodiments also provide a device for uploading data to a social platform, which is used to upload content which the user is interested in to a social platform. The device may be set in a browser device. FIG. 2 is a diagram illustrating a device for uploading data to a social platform according to various embodiments. As shown in FIG. 2, the device may include an interacting module 21, a data obtaining module 22, a plugin module 23, and an identity authenticating module 24. The data obtaining module 22 is connected with the interacting module 21, the plugin module 23 is connected with the data obtaining module 22, and the identity authenticating module 24 is connected with the plugin module 23.

The interacting module 21 is configured to receive a request for uploading data to a social platform. That is, when a user wants to upload content that the user is interested in to a social platform for sharing, the user may send a request for uploading data to the interacting module 21. After the interacting module 21 receives the request for uploading data, the data obtaining module 22 may obtain corresponding data to be uploaded according to the request. The data to be uploaded may be an image or text data. When the device is located in a browser, the data obtaining module 22 may utilize the screenshot function of the browser to obtain a screenshot image of a selected area, current visible page or the whole page and take the screenshot image as data to be uploaded.

The plugin module 23 integrates at least one API possessing publishing function provided by at least one social platform and is configured to upload data to corresponding social platforms through corresponding API after the data obtaining module 22 obtains the data. It is possible to register information of a developer on the corresponding social platform in advance and then obtain a SDK released by the social platform. The SDK usually includes an API possessing publishing function. The API possessing publishing function may be integrated by the plugin module 23. Since the SDK provided by a social platform includes an API possessing publishing function, data may be directly uploaded to corresponding social platforms through the plugin module 23 so that information may be published. Due to the plugin module 23, which integrates APIs possessing publishing function of multiple social platforms simultaneously, the plugin module 23 may upload data to multiple social platforms simultaneously.

The identity authentication module 24 is configured to send authentication information to corresponding social platforms, to perform authentication through an authentication communication protocol interface (included in the SDK) which is provided by the social platform, and integrated by the plugin module 23. The authentication communication protocol may be OAuth protocol. After the authentication is passed, it may be ensured that data uploaded on the social platform may be released to the correct account of the user. According to various embodiments, when a user uploads data to a social platform for the first time, the identity authentication module 24 may perform identity authentication on the user, and subsequently, the user may directly upload data to the social platform without identity authentication.

In order to facilitate understanding of an application procedure for uploading data to a social platform according to various embodiments, a plugin set in a browser of a mobile phone terminal is taken as an example. FIGS. 3 to 7 are flow diagrams illustrating an application procedure for uploading data to a social platform according to various embodiments.

Figure 3:
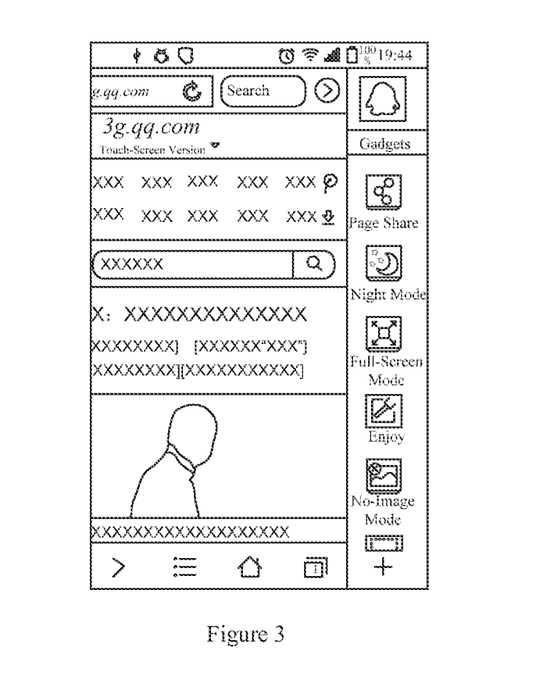
FIG. 3 is a flow diagram illustrating a first procedure of an application for uploading data to a social platform according to various embodiments.
Figure 4:
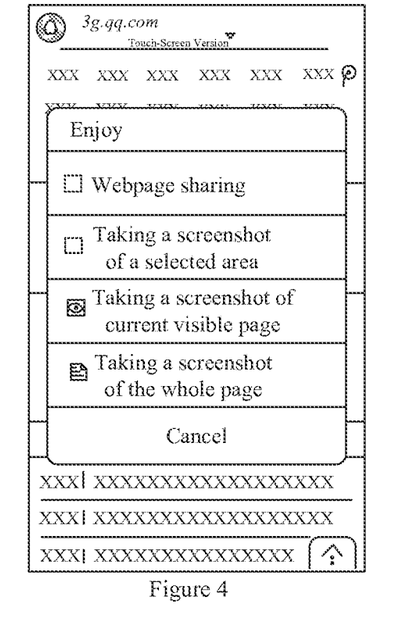
FIG. 4 is a flow diagram illustrating a second procedure of an application for uploading data to a social platform according to various embodiments
Figure 5:
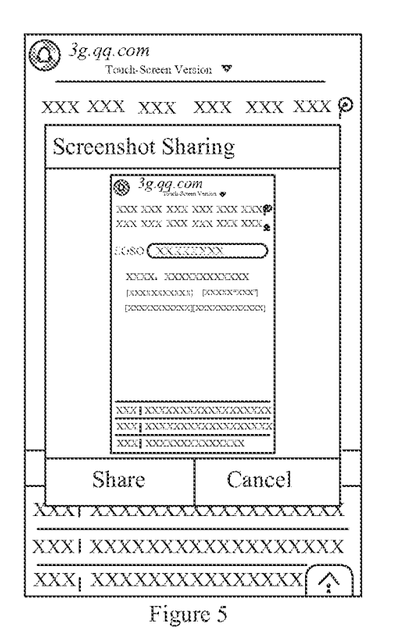
FIG. 5 is a flow diagram illustrating a third procedure of an application for uploading data to a social platform according to various embodiments
Figure 6:
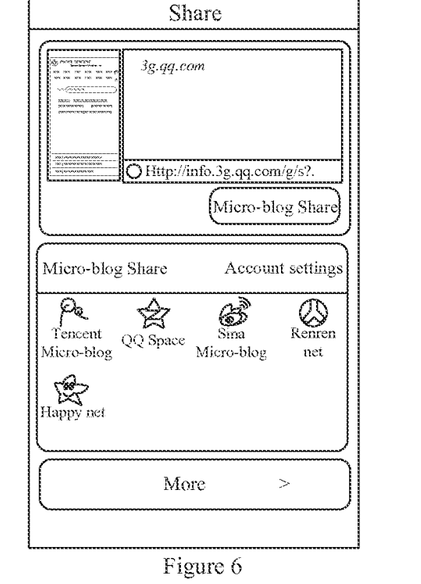
FIG. 6 is a flow diagram illustrating a fourth procedure of an application for uploading data to a social platform according to various embodiments.
Figure 7:
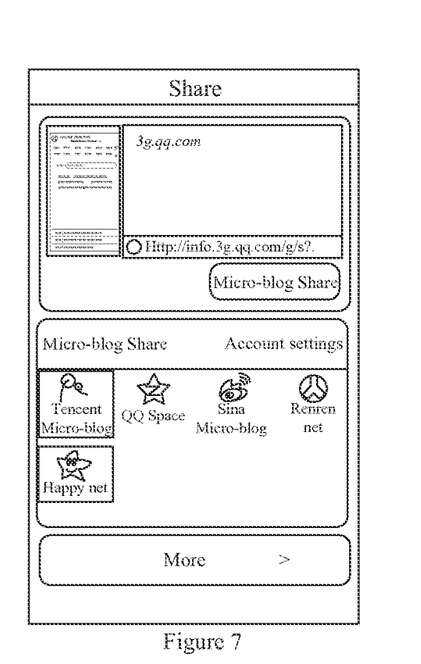
FIG. 7 is flow diagram illustrating a fifth procedure of an application for uploading data to a social platform according to various embodiments.

FIG. 3 is a flow diagram illustrating a first procedure of an application for uploading data to a social platform according to various embodiments. As shown in FIG. 3, the plugin is set in the sidebar of the browser, namely, the "page share" icon. When the user browses content which the user is interested in, the user may click the "page share" icon and a dialogue page as shown in FIG. 4 may then be opened. As shown in FIG. 4, the dialogue page of the example provides three screenshot options, namely, an option of taking a screenshot of a selected area, an option of taking a screenshot of a current visible page, and an option of taking a screenshot of the whole page. When the user clicks the option of taking a screenshot of a current visible page, a screenshot image of the current visible page may be taken using the screenshot function of the browser and a sharing page as shown in FIG. 6 may then be opened. As shown in FIG. 6, a title, a screenshot image and an address of the webpage to be shared, and five social platforms supporting sharing are displayed on the sharing page. The five social platforms are Tencent micro-blog, QQ space, Sina microblog, Renren net and Happy net, among which one or more social platforms may be selected to perform information publishing. As shown in FIG. 7, Tencent micro-blog and Happy net are selected simultaneously. When data is uploaded to a social platform for the first time, an identity authentication page of the social platform may be opened when the social platform is clicked and, after the identity authentication is passed, the data may be shared on the social platform. As can be seen, the plugin supports data sharing in multiple platforms simultaneously. In addition, the plugin also supports data sharing when receiving a local Internet request.

According to various embodiments, data may be uploaded to one or more social platforms simultaneously through a plugin without launching client terminals of corresponding social platforms. Thus, the operation of uploading data to a social platform is simplified and uploading speed is increased. For a mobile terminal, device resources may be saved since it is not necessary to install a client terminal of the social platform.

The above various embodiments may be implemented by hardware, software, firmware, or a combination thereof. For example, the various methods, processes and functional modules described herein may be implemented by a processor (the term processor is interpreted broadly to include a CPU, processing unit/module, ASIC, logic module, or programmable gate array, etc.). The processes, methods, and functional modules may all be performed by a single processor or split between several processors; reference in this disclosure or the claims to a 'processor' should thus be interpreted to mean 'one or more processors'. The processes, methods, and functional modules are implemented as machine readable instructions executable by one or more processors, hardware logic circuitry of the one or more processors or a combination thereof. The modules, if mentioned in the aforesaid examples, may be combined into one module or further divided into a plurality of sub-modules. Further, the various embodiments disclosed herein may be implemented in the form of a software product. The computer software product is stored in a non-transitory storage medium and comprises a plurality of instructions for making an electronic device implement the method recited in the various embodiments.

Figure 8:
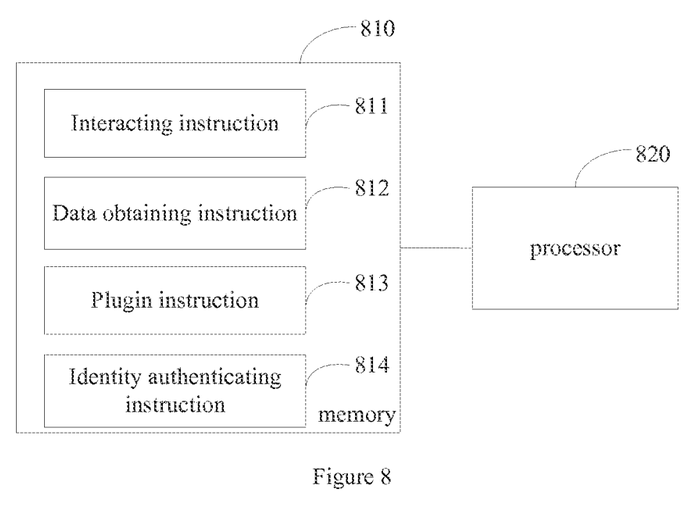
FIG. 8 is a diagram illustrating another structure of the device for uploading data to a social platform according to various embodiments.

For example, FIG. 8 is a diagram illustrating another structure of the device for uploading data to a social platform according to carious embodiments. As shown in FIG. 8, the device may include a memory 810 and a processor 820 in communication with the memory 810.

The memory 810 may store a group of instructions which may be executed by the processor 820. The instructions may include an interacting instruction 811, a data obtaining instruction 812, a plugin instruction 813, and an identity authenticating instruction 814, which may be respectively executed by the processor 820 to respectively implement the operations of the interacting module 21, the data obtaining module 22, the plugin module 23, and the identity authenticating module 24 mentioned above.

The foregoing description, for purpose of explanation, has been described with reference to specific examples. However, the illustrative discussions above are not intended to be exhaustive or to limit the present disclosure to the precise forms disclosed. Many modifications and variations are possible in view of the above teachings. The examples were chosen and described in order to best explain the principles of the present disclosure and its practical applications, to thereby enable those skilled in the art to best utilize the present disclosure and various embodiments with various modifications as are suited to the particular use.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

What is claimed is:

1. A method for uploading data to a social platform, comprising:
   setting a plugin into an application program, wherein the plugin integrates multiple Application Program Interfaces (API) corresponding to multiple social platforms, each API possessing a publishing function provided by at least one of the multiple social platforms;
   after the plugin is set into the application program, opening, by the application program, a page;
   receiving a request for uploading data associated with the opened page in response to an icon corresponding to the plugin being selected on the user interface of the application program;
   obtaining data to be uploaded according to the request;
   after obtaining the data to be uploaded, determining at least two social platforms for uploading the data based on user selection among the multiple social platforms whose APIs are integrated by the plugin; and
   simultaneously uploading the data to the at least two social platforms through one or more corresponding API integrated by the plugin,
   wherein setting the plugin into the application program comprises:
   adding an attribute of the plugin into a declaration file of the application program, the declaration file being directed to an operating system running the application program; and
   configuring the plugin to inherit an abstract class specified in an SDK of the application program.

2. The method according to claim 1, wherein the application program is a browser.

3. The method according to claim 2, wherein setting the plugin into the application program comprises:
   setting a sidebar plugin into the browser.

4. The method according to claim 2, wherein the data to be uploaded comprises:
   image data obtained by taking a screenshot of a selected area or current visible page or the whole page.

5. The method according to claim 1, before uploading the data, further comprising:
   determining whether a user who wants to upload the data passes an identity authentication of one of the at least two social platforms;
   when the user does not pass the identity authentication of the one of the at least two social platforms, sending authentication information to the one of the at least two social platforms through an authentication communication protocol interface which is integrated by the plugin and provided by the one of the at least two social platforms.

6. The method according to claim 5, wherein sending authentication information comprises:
   sending the authentication information to the one of the at least two social platforms through the authentication communication protocol interface adopting an OAuth protocol.

7. The method according to claim 1, further comprising:
   before setting the plugin into the application program,
      registering developer information on each social platform of the multiple social platforms;
      receiving API verification numbers returned by the multiple social platforms;
      obtaining a plurality of Software Development Kits, SDKs, of the multiple social platforms using the API verification numbers;
      obtaining the multiple APIs possessing publishing functions provided by the multiple social platform from the plurality of SDKs; and
   integrating the multiple APIs possessing the publishing functions of the multiple social platforms obtained from the plurality of SDKs into the single plugin.

8. The method according to claim 1, further comprising:
   in response to the icon corresponding to the plugin being selected on the user interface of the application program, presenting a dialogue interface with multiple options specifying multiple types of information associated with the opened page;
obtaining the data to be uploaded according to one of the multiple options selected on the dialog interface.

9. The method according to claim 8, wherein:
the multiple options include taking a screenshot of: a selected area, a current visible page, and a whole page.

10. The method according to claim 9, wherein:
the data to be uploaded includes: a title, the screenshot, and an address of the opened page.

11. A device for uploading data to a social platform, comprising:
a memory;
a processor coupled to the memory, the processor being configured to:
set a plugin into an application program, wherein the plugin integrates multiple Application Program Interfaces (API) corresponding to multiple social platforms, each API possessing a publishing function provided by at least one of the multiple social platforms;
after the plugin is set into the application program, open, by the application program, a page;
receive a request for uploading data associated with the opened page in response to an icon corresponding to the plugin being selected on the user interface of the application program;
obtain data to be uploaded according to the request;
after obtaining the data to be uploaded, determine at least two social platforms for uploading the data based on user selection among the multiple social platforms whose APIs are integrated by the plugin; and
simultaneously upload the data to the at least two social platforms through one or more corresponding API,
wherein setting the plugin into the application program further comprises:
adding an attribute of the plugin into a declaration file of the application program, the declaration file being directed to an operating system running the application program; and
configuring the plugin to inherit an abstract class specified in an SDK of the application program.

12. The device according to claim 11, wherein the device is set in a browser device.

13. The device according to claim 12, wherein the data to be uploaded comprises:
image data obtained by taking a screenshot of a selected area or current visible page or the whole page.

14. The device according to claim 11, wherein the processor is further configured to send authentication information to the one of the at least two social platforms through an authentication communication protocol interface.

15. The device according to claim 14, wherein the authentication information is sent to the one of the at least two social platforms through the authentication communication protocol interface adopting an OAuth protocol.

16. A non-transitory computer-readable storage medium which stores one or more programs, when executed by one or more processors, performs a method for uploading data to a social platform; the method comprising:
setting a plugin into an application program, wherein the plugin integrates multiple Application Program Interfaces (API) corresponding to multiple social platforms, each API possessing a publishing function provided by at least one of the multiple social platforms;
after the plugin is set into the application program, opening, by the application program, a page;
receiving a request for uploading data associated with the opened page in response to an icon corresponding to the plugin being selected on the user interface of the application program;
obtaining data to be uploaded according to the request;
after obtaining the data to be uploaded, determining at least two social platforms for uploading the data based on user selection among the multiple social platforms whose APIs are integrated by the plugin; and
simultaneously uploading the data to the at least two social platforms through one or more corresponding API integrated by the plugin,
wherein setting the plugin into the application program comprises:
adding an attribute of the plugin into a declaration file of the application program, the declaration file being directed to an operating system running the application program; and
configuring the plugin to inherit an abstract class specified in an SDK of the application program.

17. The non-transitory computer-readable storage medium according to claim 16, wherein the application program is a browser.

18. The non-transitory computer-readable storage medium according to claim 17, wherein the data to be uploaded comprises:
image data obtained by taking a screenshot of a selected area or current visible page or the whole page.

19. The non-transitory computer-readable storage medium according to claim 16, wherein the method further comprises: before uploading the data,
determining whether a user who wants to upload the data passes an identity authentication of one of the at least two social platforms;
when the user does not pass the identity authentication of the one of the at least two social platforms, sending authentication information to the one of the at least two social platforms through an authentication communication protocol interface which is integrated by the plugin and provided by the one of the at least two social platforms.

* * * * *